Patented June 24, 1930

1,767,234

UNITED STATES PATENT OFFICE

WILLIAM BURTON WESCOTT, OF DOVER, MASSACHUSETTS, ASSIGNOR TO RUBBER LATEX RESEARCH CORPORATION, OF BOSTON, MASSACHUSETTS, A CORPORATION OF MASSACHUSETTS

TREAD STOCK AND METHOD OF MAKING THE SAME

No Drawing.   Application filed March 28, 1924. Serial No. 702,697.

The present invention relates to a material adapted for use in the manufacture of various kinds of treads such as rubber heels, rubber soles, tread for automobile tires and the like.

The object of the invention is to produce a stock adapted for use by the usual vulcanizing processes in making rubber heels, soles, tire treads and the like. The invention also consists in the method of making the stock. To these ends the invention consists in the stock and method of making the same hereinafter described and particularly defined in the claims.

Heretofore fibrous material has been introduced into rubber compounds by milling operations. This, however, has resulted in destroying the staple, thereby shortening the fibre to such an extent as to render it practically valueless as a friction material. These fibres are practically reduced by the milling operation to dust, and confer only slight resistance to slipping of the tread in use. I have discovered that fibre of such lengths as to be available for efficient use as a slipping preventative in treads may be introduced into a product without milling operation, and therefore without the usual destruction of the fibre. The invention contemplates the use of comminuted rubber goods containing fibre such as worn out tire carcasses, rubber boots, rubber shoes and the like. The material is comminuted in the ordinary manner which is practiced in reclaiming rubber, and the particular method of comminuting the old fibre and rubber material forms no part of the present invention.

Beginning, therefore, with the comminuted rubber and fibre material, this material is more or less separated by blowing to divide the larger and heavier particles of rubber from the lighter particles of cotton, and the cotton dust, so-called, constitutes the principal ingredient of the stock which it is proposed to make. This may conveniently be termed comminuted rubber-fibre material. It consists principally of cotton to which is adherent particles of partially cured rubber, that is to say, rubber with a sulphur content insufficient to reduce the rubber to the condition of vulcanite, or hard rubber, when subjected to vulcanizing heat and pressure. It also consists in particles of rubber to which small pieces of cotton are adherent. The rubber-fibre material consists of about 50% fibre and 50% partially cured rubber. This material is impregnated with fluid rubber latex by stirring the rubber-fibre material into the fluid rubber latex until the rubber-fibre material is substantially completely wetted, that is to say, until the particles of rubber-fibre material are coated with fluid rubber latex.

The fluid rubber latex consists of the latex drawn from the rubber tree to which has been added alkali for the purpose of preventing coagulation, in which condition the fluid rubber latex is imported from the plantation. This rubber latex is a fluid of varying composition, carrying emulsified minute particles of rubber or material which becomes rubber after coagulation or passing through an irreversible solidification to a gel. When fluid rubber latex is dried down, without coagulation, it forms a gel containing, in addition to rubber, all the other solids dissolved and undissolved of the original latex. This dry latex gel differs in many ways from ordinary coagulated rubber. While any of the commercial grades of fluid latex may be used to wet the comminuted rubber-fibre material, I find a marked advantage in the use of one which has been freed, as far as possible, of all its soluble non-rubber natural constituents such as carbohydrates, proteids, etc. The wet mixture of fluid rubber latex and rubber-fibre material is poured in a mass upon a screen and vibrated to permit any excess of the fluid rubber latex to flow off. When the dripping of fluid rubber latex ceases the mass is dried in cakes or slabs of a thickness suitable for the particular form of tread in which it is to be used. The dried product is an adherent body of fibre and rubber particles united by a small percentage of pure rubber gum, or, more properly speaking, latex rubber gel. The rubber-fibre particles constitute about 90% by weight of the stock, and the gel about 10% by weight. This material may be blanked out to form biscuit adapted to be placed in a mold for making rubber heels or soles, or into blanks for use in making automobile tire treads, or for any other purpose where a tread is desired having a large fibre content which will operate in use to prevent slipping of the tread on the surfaces with which it comes in contact. The stock is of a dark grayish color with white flecks appearing throughout, which are larger pieces of the fibre particles. The fibre in the stock has not, of course, the staple of unreclaimed fibre such as cotton fibre, but it has a staple of sufficient length so that pieces of fibre are embedded in and held by the stock, and its ends go to the surfaces where the material is subjected to wear.

This tread stock is adapted to vulcanization in the ordinary manner in vulcanizing presses, and when vulcanized the sulphur of the rubber-fibre material operates to vulcanize the pure gum which holds the particles of the rubber-fibre material together in the stock. The completed vulcanized tread, therefore, comprises particles of rubber and fibre united by interstitial vulcanized latex rubber, and the product is light in weight, resilient, and with a high coefficient of friction not only in contact with dry surfaces, but also with wet surfaces of pavement, wood and the like.

The amount of pure gum or latex gel introduced into the stock may be varied by aqueous dilution. With a higher percentage of diluent, the amount of rubber introduced into the stock is reduced, and conversely, with a less amount of water in the fluid rubber latex, a higher percentage of gum will be introduced into the stock. The percentage of gum may, therefore, be determined with great nicety and with avoidance of waste, and only sufficient is used to secure the desired results without waste.

When the wetted mass of rubber-fibre material is drained of the fluid rubber latex no losses occur because the fluid rubber latex draining off is returned directly to the original body of the material without loss or injury.

It is preferred to dry the rubber-fibre material wetted with fluid rubber latex without compression because the stock when formed in this manner is highly porous, and its drying is thereby facilitated. In order to expedite the process, the excess of fluid rubber latex may be removed by centrifuging or by pressing, but the gain in time secured thereby is more than offset by the additional time required in the drying operation. It is obvious that the stock must be thoroughly deprived of water before it is placed in the molds for vulcanizing. Therefore, unless special circumstances require the mechanical removal of the surplus fluid latex from the latex wetted rubber-fibre material, it is performed without centrifuging or pressure operations.

In some instances, however, where the form of the blank or biscuit to be used in the manufacture of the tread is such as to permit, the process of preparing the biscuit may be expedited by centrifuging or pressure. For example, it is proposed to produce biscuit for use in the manufacture of heels by expressing part of the excessive fluid latex by pressure and then extruding a rod of a cross-section corresponding to the shape of the proposed rubber heel blank, and after the rods are dried, cutting them transversely to form heel biscuit, which are then compressed.

An important characteristic of the method consists in the uniting of particles of fibre and partially cured rubber by means of a filmiform deposit of rubber gel from fluid rubber latex, the vulcanization of the uniting film being accomplished by the utilization of the sulphur in the rubber-fibre material. Additional sulphur, or other vulcanizing agent, may be employed if desired, but usually in amount less than that in the rubber-fibre material.

The stock produced by this method has a high fibre content, and it is united into a coherent, flexible, homogeneous mass by the latex rubber gel which unites the particles of partially cured rubber and particles of fibre. This stock is adapted to be made in a form such as to be introduced into the mold cavities, and until placed in the mold and subjected to heat to retain its form, and yet when subjected to heat and pressure to flow into and fill the mold cavity, and therefore it is adapted to convenient use in making molded rubber treads.

The fibre content of the rubber-fibre material may be increased or decreased, depending upon the abrasive resistant characteristics desired in the product to be made from the stock. The least expensive stock will be formed of fibre stock to which are adherent particles of rubber without addition of fibre just as it comes from the rubber-fibre separation of the comminuted raw materials. In some cases, however, it may be desired to add more fibre, and for this purpose pure fibre may be employed in order to increase the percentage of fibre and the abrasive resistant qualities of the product made from the stock. On the other hand, if it is desired to produce a tread having greater resiliency than that secured by treating the fibre produced from the blowing process, an added quantity of comminuted partially cured rubber may be used.

If it be desired to produce a stock of a particular color, water soluble dye, preferably with an adsorptive filler may be used in the fluid rubber latex or pigmentous material may be added thereto to produce the desired color in the stock.

Having thus described the invention, what is claimed is:

1. The method of making tread stock which consists in mixing and surrounding comminuted, partially cured rubber-fibre particles with alkaline fluid rubber latex in relatively small proportion compared to the weight of rubber-fibre material, and drying the mixture without coagulation of the latex to form an interstitial gel uniting the rubber-fibre particles.

2. The method of making tread stock which consists in wetting partially cured rubber particles and fibre with an excess of alkaline fluid rubber latex, removing the excess of fluid and drying the material without coagulation of the latex to form an interstitial gel uniting the rubber-fibre particles.

3. As an article of manufacture, a rubber fibre tread stock consisting of particles of partially cured rubber and fibre united by interstitial latex rubber gel.

4. The method of making tread stock which consists in wetting partially cured rubber particles and fibre with alkaline fluid rubber latex substantially free from soluble non-rubber natural latex constituents and drying the material without coagulation of the latex to form an interstitial gel uniting the rubber-fibre particles.

5. As an article of manufacture, a rubber fibre tread stock, consisting of particles of partially cured rubber and fibre united by interstitial latex rubber gel substantially free from soluble non-rubber natural latex constituents.

6. As an article of manufacture, a rubber fibre tread stock consisting of particles of partially cured rubber and fibre constituting the major portion of the weight of the article, and interstitial latex rubber gel surrounding and uniting the particles of rubber and fibre.

7. The method of making tread stock which consists in mixing and surrounding comminuted, partially cured rubber-fibre particles with alkaline fluid rubber latex, and drying the mixture without coagulation of the latex to form an interstitial gel uniting the rubber-fibre particles.

In testimony whereof I have signed my name to this specification.

WILLIAM BURTON WESCOTT.